United States Patent
Krämer et al.

(10) Patent No.: US 6,923,084 B2
(45) Date of Patent: Aug. 2, 2005

(54) ARRANGEMENT FOR INCREASING A SELECTION FORCE

(75) Inventors: Klaus Krämer, Baudenbach (DE); Susanne Pintus, Herzogenaurach (DE)

(73) Assignee: INA-Schaeffler KG, Herzogenaurach (DE)

( * ) Notice: Subject to any disclaimer, the term of this patent is extended or adjusted under 35 U.S.C. 154(b) by 173 days.

(21) Appl. No.: 10/352,670

(22) Filed: Jan. 28, 2003

(65) Prior Publication Data

US 2003/0140721 A1 Jul. 31, 2003

Related U.S. Application Data

(60) Provisional application No. 60/353,315, filed on Jan. 31, 2002.

(30) Foreign Application Priority Data

Feb. 2, 2002 (DE) .......................... 102 04 230

(51) Int. Cl.⁷ .......................... B60K 20/00; B60K 6/00; G05G 9/00
(52) U.S. Cl. ................ 74/473.33; 74/473.3; 74/473.21; 74/473.24; 74/473.35; 74/527
(58) Field of Search .......................... 74/473.3, 473.33, 74/473.35, 473.21, 470, 527, 473.24, 473.25, 473.26, 473.27, 473.28

(56) References Cited

U.S. PATENT DOCUMENTS

| | | | | |
|---|---|---|---|---|
| 4,229,993 A | * | 10/1980 | Andresen ...................... | 74/538 |
| 4,567,785 A | * | 2/1986 | Reynolds et al. ......... | 74/473.24 |
| 4,987,792 A | * | 1/1991 | Mueller et al. .......... | 74/473.12 |
| 5,036,721 A | | 8/1991 | Gugin | |
| 5,050,449 A | | 9/1991 | Falcou et al. | |
| 5,150,633 A | * | 9/1992 | Hillgartner ............... | 74/473.18 |
| 5,845,535 A | * | 12/1998 | Wakabayashi et al. ... | 74/473.18 |
| 5,845,536 A | * | 12/1998 | Certeza .................... | 74/473.26 |
| 6,026,702 A | | 2/2000 | Dreier et al. | |
| 6,230,579 B1 | | 5/2001 | Reasoner et al. | |
| 6,308,814 B1 | | 10/2001 | Ikegami | |
| 6,311,577 B1 | * | 11/2001 | Worner et al. ........... | 74/473.21 |
| 6,325,196 B1 | | 12/2001 | Beattie et al. | |

FOREIGN PATENT DOCUMENTS

| | | |
|---|---|---|
| DE | 199 18 509 A1 | 12/0000 |
| DE | 31 25 632 C1 | 12/1982 |
| DE | 31 36 923 C1 | 1/1983 |
| DE | 41 10 012 C1 | 5/1992 |
| DE | 690 04 303 T2 | 2/1994 |
| DE | 43 09 861 C1 | 10/1994 |
| DE | 195 44 837 A1 | 6/1996 |
| DE | 197 23 507 A1 | 1/1999 |
| DE | 199 01 056 A1 | 8/1999 |
| DE | 100 51 381 A1 | 5/2001 |
| DE | 100 15 079 A1 | 10/2001 |
| JP | 2001-125318 | 5/2001 |
| JP | 2001-206094 | 7/2001 |

\* cited by examiner

*Primary Examiner*—David A. Bucci
*Assistant Examiner*—Colby Hansen
(74) *Attorney, Agent, or Firm*—Volpe and Koenig, P.C.

(57) ABSTRACT

A device for increasing a selection force is integrated into a support arrangement of a shift lever. The device is pivotable around a pivot axis and also around a tilt axis aligned transversely to the pivot axis. The selection force upon pivoting movements of the shift lever around the tilt axis is produced by at least one lever that is movable against a spring and a runoff roller placed in operative connection with the lever (24, 38). The device is integrated into a support arrangement for pivotable support of the shift lever by a casing in a housing. The support arrangement supports the shift lever pivotably with respect to the casing around the pivot axis and also supports the shift lever with the casing pivotably with respect to the housing around the tilt axis aligned transversely to the pivot axis.

13 Claims, 11 Drawing Sheets

ARRANGEMENT FOR INCREASING A SELECTION FORCE

CROSS-REFERENCE TO RELATED APPLICATIONS

This application claims the benefit of U.S. Provisional Application No. 60/353,315, filed Jan. 31, 2002, which is incorporated herein by reference as if fully set forth.

BACKGROUND

The invention relates to a device for increasing a selection force on a shift lever which is pivotable around a pivot axis and also around a tilt axis aligned transversely of the pivot axis, wherein the selection force is produced, upon pivoting movements of the shift lever around the tilt axis, by means of at least one lever movable against a spring and a runoff roller placed in an operative connection with the lever.

A device for the production of selection forces is described in EP 0 849 506 A1. A selection link is non-rotatably fastened to a selector shaft. A roller is arranged at the free end of the selection link, and a spring-loaded lever system acts thereon. On pivoting the shift shaft, different and defined resistances against pivoting are produced on the shift shaft by means of spring-loaded levers. The resulting selection forces are schematically described in a shift schematic. The shift schematic for a six-gear gearbox is shown. Three adjacent shift planes are provided for the shifting of the six forward gears. The reverse gear is shifted in a fourth shift plane. A shift diagram sketched in the shift schematic shows the course of the selection force in dependence on the selection path. A movement along the abscissa between the individual shift planes corresponds to pivoting the shift shaft. Selection forces are produced by means of the described device upon a movement out of the neutral position (shift plane of third and fourth gears) to the right into the shift plane of the fifth and sixth gears and furthermore on selection into the shift plane of the reverse gear. On selection into the shift plane of the reverse gear, the selection force rises abruptly and signals the selection of reverse gear to the operator. The operator is informed by the markedly rising shift force on the shift lever on selection of the shift plane of the reverse gear that he is about to engage reverse gear. The orientation of the operator as regards the position of the shift lever to the gears is thus facilitated. The signal given to the operator by the rising selection force is in particular used to warn the operator of the inadvertent changing from a shift plane for forward gears into the shift plane for reverse gear. This so-called "crash lock" acts on inadvertent selection but also on intentional selection of the shift plane of the reverse gear. The selection force is for a moment substantially higher than the forces occurring at the shift knob on selection of the shift planes for forward gears. After the increased selection force is overcome, the actuating force decreases again to a normal level.

It is disadvantageous on devices of this kind that because of the many individual parts the cost of assembly of the gearbox is relatively high.

The device for increasing the selection force is used in shift devices for shifting of gears by means of a shift lever. A respective shift plane is allocated to one or two selectively shiftable gears situated on a gearshaft. Several gears can be shifted by the shift device. A shift plane is allocated to at least one gear, or at most two gears. Each gear can be shifted only in its predetermined shift plane.

The shift lever is arranged pivotably with respect to a housing by means of a support arrangement. The support arrangement makes possible pivoting movements of the shift lever in a selection plane and in a shift plane aligned transversely of the selection plane. The shift lever is guided by a slide during the selection and shifting processes.

The shift lever is located in the selection plane in a neutral position and is pivotable in the selection plane out of the neutral position by the selection of shift planes alternatively into one of at least two inoperative positions. If the shift lever is located in one of the inoperative positions, a shift plane is selected. The shift lever is pivotable out of the inoperative position in the shift plane for shifting one of the gears. The neutral position of the shift lever is for the most part also one of the inoperative positions, from which one of two gears is selectively shiftable.

In the inoperative positions or in the neutral position of the shift lever, selector shafts are located in a middle, neutral position, in which the gears shiftable by means of the selector shafts are not shifted. The shift lever is provided with a shift finger at a free end. Each of the selector shafts has an engagement groove or a shift opening for the engagement of the shift finger. A selective engagement in one of at least two axially parallel selector shafts is performed by selection movements of the shift lever. The shift lever is movably coupled to one of the selector shafts in these positions.

Pivoting of the shift lever in the shift plane out of the inoperative position in one or other direction results in a displacement of the selector shaft coupled to the shift lever, since the shift finger acts on a side bounding the engagement groove. One of the gears allocated to the selector shaft is engaged by the displacement of the selector shaft.

The shift lever is pivotably received by means of a universal joint in a housing fixed to a vehicle. This joint or this support arrangement provides for a casing of box-like constitution. The casing receives the shift lever and is mounted for pivoting, by means of the shift lever, on the housing fixed to the vehicle, around a tilt axis aligned transversely to the pivot axis. The tilt axis is aligned with the mid-axis of alternatively one or two pivot studs. The pivot studs support the casing on the housing, pivotably in the selection plane, however not in the shifting plane. The shift lever is pivotable with the casing around the tilt axis, immovable in the casing, in the selection plane. Upon a selection movement at the shift finger, the shift lever pivoting around the tilt axis takes the casing with it. The shift finger is arranged on the shift lever on the side of the tilt axis opposite to the shift force application position (shift knob), and pivots with the shift lever in the selection plane around the tilt axis.

The support arrangement furthermore provides for support of the shift lever in the casing, pivotably around a pivot axis in the shift plane. The pivot axis runs transversely of the tilt axis. The pivot axis is simultaneously the mid-axis of a pivot stud arranged in the casing. The shift lever is supported on the casing [for pivoting] around the pivot stud in the shift plane, however not in the selection plane. The shift finger is arranged at the opposed end of the shift lever to the pivot axis and also supported in the casing pivotably around the pivot axis in the shift plane, however not in the selection plane. The pivot axis and the tilt axis are situated intersecting in a common plane.

This solution, satisfactory per se, has the disadvantage that because the shift axis and pivot axis of the shift lever are situated in one plane, limits are placed on the adjustment of shift forces and shift paths. By shift forces are to be understood the forces which are perceptible at the shift lever by the operator at the point of force application (shift knob) upon selection and shifting. At its point of force application, the shift lever covers defined paths during selection and shifting. Each further point on the lever between the point of force application and the pivot axis or tilt axis also covers paths defined by its distance from the axes. The path, for the most part in radian measure, is dependent on the distance of the shift knob to the axes. At the same pivot angle of the shift lever around the tilt axis or the pivot axis, each of the points covers the same path, independently of whether it is pivoted around the tilt axis or the pivot axis. The shift lever is often guided by a shift slide placed between the point of force application and the axes. The design of slides which save material and space is frequently subject to limitations because of the same path of the shift lever in the slide during selection and shift movements. The shift forces on the shift knob can be affected by the lever ratio of the shift lever. The lever ratio results from the distance from the knob to the axes and from the distance from the axes to the engagement of the shift finger in the engagement groove of the selector shaft. The length of the shift lever projecting into the passenger space is as a rule limited according to construction space. The length of the shift finger, starting from the intersecting axes, is dependent on the position of the elements of the internal shifting arrangements.

SUMMARY OF THE INVENTION

At the time of the invention, the object was to provide a simple and cost-effective device which can be integrated with little cost into a gearbox.

This object is attained according to the characterizing portion of claim 1, in that the device is integrated into a support arrangement for pivotably supporting a shift lever by means of a casing in a housing, wherein the support arrangement supports the shift lever in the casing pivotably around a pivot axis with respect to the casing and also supports the shift lever pivotably with the casing, around a tilt axis aligned transversely of the pivot axis, with respect to the housing.

The device is formed at least from a ramp fixed to the casing and at least one runoff roller. The runoff roller is prestressed against the ramp by means of a spring. The ramp is preferably formed of a metal sheet, stamped and if necessary with cutting or non-cutting finishing. The metal sheet is welded to the casing. Alternatively thereto, the ramp is provided, directly formed on a casing formed from sheet metal. Upon pivoting movements of the shift lever around the tilt axis, the ramp pivots with the casing against the runoff roller supported on the housing. The runoff roller then rolls on the ramp. The forces upon selection of a shift plane of the forward gears and also upon selecting reverses gear are controllable by means of the force of the spring and the contour of the ramp. The ramp rises over at least one imaginary abscissa extending transversely from an imaginary plane. The plane runs here with the tilt axis and is aligned so that the pivot axis passes through it at right angles. The ramp rises over the abscissa away from the plane. The runoff roller is supported to rotate around a rotation axis which is stationary with respect to the housing. The shift lever pivoted around the tilt axis takes with it the casing with the ramp. The ramp is moved against the runoff roller. The runoff roller then rises on the ramp against the force of the spring. The selection force is increased.

Alternative embodiments are provided for the alignment of the ordinate which is at right angles to the abscissa and describes the rise. One embodiment provides that the ordinate runs with the plane parallel to the tilt axis. The ramp points away from the casing. Its contour which comes into contact with the runoff roller moves away from the casing with increasing rise. The runoff roller is thereby preloaded against the ramp in the direction of the casing.

The runoff roller is rotatably fastened to a lever. The lever is arranged pivotably around a pivot fixed to the housing. One or more springs engage on the lever at a distance from the pivot of the lever. The lever is preloaded against the ramp via the runoff roller by means of the spring. The rotation axis running through the pivot of the lever and around which the lever pivots, and the rotation axis of the roller, are aligned transversely of the tilt axis of the shift lever, and preferably run parallel to the wall of the casing. A uniform force distribution is attained with two ramps on the casing. One of the previously described levers with a respective one of the runoff rollers acts on each of the ramps. The levers are arranged mutually opposite to each other on each side of the casing. The levers on the casing with the ramps between them are preloaded against one another by means of at least one tension spring. The tension spring is respectively inset at a free end, remote from the pivot, of one of the levers. A uniform force distribution and an equalization of movement between the levers are thus ensured.

Alternatively to the alignment of the ordinate, an embodiment of the device provides that the ordinate describing the course of the contour is aligned perpendicular to the tilt axis and at the same time extends with the plane. The ordinate preferably runs parallel to one of the walls of the casing and intersects the tilt axis. The ramp is therefore loaded by means of the runoff roller either in the direction of the tilt axis of the shift lever or out of the direction of the tilt axis of the shift lever. The runoff roller is furthermore rotatably fastened to a lever. The lever is pivotable around a fulcrum fixed to the housing. At least one, or possibly more, springs which engage the lever remote from the fulcrum preload the lever by means of the runoff roller against the ramp pointing away from the tilt axis or pointing toward the pivot axis. The rotation axis, running through the fulcrum, of the lever and the rotation axis of the roller are aligned parallel to the tilt axis of the shift lever. For this alternative embodiment, it is furthermore provided that two ramps are arranged on the casing. The ramps are fastened or provided on two wall sections of the casing which face away from one another and point outward. A respective one of the levers, with a respective one of the runoff rollers, acts on each of the ramps. Each of the levers is preloaded against the ramp via one of the runoff rollers by means of a spring supported on the housing.

It is provided by a further embodiment of the invention that the ramp rises on both sides away from the plane, starting from a coordinate origin, situated in the plane, of the coordinate system formed by the abscissas and the ordinates, over a first abscissa and also over a second abscissa directed oppositely to the first abscissa. The shift lever when in the neutral position stands vertically in the casing. The mid-axis of the shift lever then runs with the plane extending out from the tilt axis. The ramp rises on both sides of the plane starting from the coordinate origin and also away from the plane. The runoff roller abutting on the ramp at the height of the coordinate origin in the neutral position is centered with respect to the coordinate origin by means of the rising flanks. The spring force acting on the lever forces the runoff roller into this depression on the ramp and thus keeps the casing arrested in the neutral position of the shift lever by means of the force of the spring. The course of the ramp can be shaped as a mirror image from one side of the plane to the other side of the plane, or can have a different rise from one side of the plane to the other side of the plane. Selection forces can additionally be fine adjusted by means of the number, spring characteristics, and lever ratios on the levers.

The rise of the ramp has a considerable effect on the selection force on the shift lever pivoting around the tilt axis. For the selection of the shift planes of the forward gears in a multi-gear gearbox, a flat rise of the ramps on both sides of the plane is provided. The runoff roller runs off on this portion of the ramp when the shift lever is selectively pivoted around the tilt axis in one or other pivoting direction for selecting one of the shift planes of the forward gears. The counterforce on the shift lever increases only slightly with increasing pivot angle of the shift lever. To select the shift plane of the reverse gear, the shift lever is pivoted in a pivoting direction beyond its position in a shift plane with forward gears and out into the shift plane of the reverse gear. The casing, with the shift lever and thus also the ramp, then pivots further. The shallow rising ramp adjoins a section on the ramp which rises in a marked bend away from the abscissa. When the shift lever reaches its position in front of the shift plane of the reverse gear, the roller runs onto the section of the ramp with the steep rise. The lever is moved against the force of the spring by means of the runoff roller rising on the steeply rising ramp. The counterforce on the casing, and thus on the shift lever, rises abruptly. The operator is signaled by means of this rise of force on the shift knob that he is about to select the reverse gear.

The casing is pivotably supported on a housing fixed to the vehicle, for pivoting by means of the shift lever around a tilt axis directed transversely of the pivot axis. The tilt axis is aligned with the middle axis of selectively one or two pivot studs. The pivot studs support the casing on the housing, pivotably in the selection plane but not in the shift plane. The shift lever is immovable with respect to the casing in the selection plane, and is pivotable with the casing around the tilt axis. Upon a selection movement on the shift finger, the shift lever pivoting around the tilt axis takes the casing with it. The shift finger is arranged on a side facing away with respect to the shift engagement, preferably on the opposite side, of the tilt axis on the shift lever, and pivots around the tilt axis with the shift lever in the selection plane.

The support arrangement furthermore provides for the pivotable support of the shift lever in the shift plane around a pivot axis in the casing. The pivot axis runs transversely of the tilt axis. The pivot axis is aligned with the centers of two opposed support eyelets in the casing, or selectively with one support eyelet constituted in the casing. The shift lever is thus mounted on the casing for pivoting in the shift plane around a pivot stud supported in the support eyelet(s), but not in the selection plane. The shift knob and the shift finger respectively face away from one another in another direction from the pivot axis. Upon shift movements, the shift lever is movably coupled by the shift finger to one of the engagement grooves of a selector shaft. The shift movement effects the displacement of the selector shaft. The shift finger here acts on a side of the engagement groove situated in the displacement direction of the selector shaft. One of the gears allocated to the selector shaft is engaged by the displacement of the selector shaft.

The pivot axis and the tilt axis are according to the invention situated horizontally on different planes, and vertically, according to the design of the support arrangement, in a common plane or in different planes. The pivot axis and the tilt axis are then situated between the point of force application on the shift knob and the shift finger. Pivoting movements around the axis situated nearest to the shift finger result, at on the shift knob and also on each of the points of the shift lever adjoining the shift knob in the direction of this axis, in a longer path in radian measure, when the shift device limits both the selection and the shift movements to the same pivot angle. It is thus provided by the design of the device that the axis situated nearest to the shift finger is the pivot axis. The tilt axis is situated more remote from the shift finger. Under the precondition that the pivoting region of the shift lever is limited to the same pivot angle in selection and in shifting, the shift knob travels a longer path on shifting the gears in comparison to selection. Alternatively, it is provided that the tilt axis is situated nearer to the shift finger in comparison to the position of the pivot axis. Under this precondition, the shift finger travels a longer path on selection of the shift planes, in comparison to shifting.

With one embodiment of the invention, it is provided that the pivot stud is non-rotatably received in the housing. The casing is pivotable around the pivot stud. A plain bearing is arranged between the pivot stud and the casing in each of the support eyelets of the casing. Alternatively thereto, the pivot stud is seated fitting exactly into the support eyelet of the casing, without a special bearing. The shift lever is either mounted pivotably around the pivot stud immovably fixed to the casing, or the pivot stud is seated fixedly in the shift lever and moves in support eyelets of the casing. Alternatively, the supports of the shift lever on the pivot studs or the supports of the pivot studs in the casing are provided with plain bearings.

The support arrangement for the shift lever according to the invention has, with the device for increasing the selection force, the latching device, and the locking device, elements which are usually arranged in the gearbox separately from a support arrangement of the shift lever. A space-saving and also easily produced shift device is provided by the invention. The support arrangement of the shift lever can be preassembled as a module, the casing of the shift lever being predominantly the basis for the fastening of further elements of the shift transmission.

BRIEF DESCRIPTION OF THE DRAWINGS

The invention is explained in detail hereinafter using exemplary embodiments.

FIGS. 1–9 show an exemplary embodiment of a support arrangement according to the invention in different views and sectional diagrams. Individually.

DETAILED DESCRIPTION OF THE PREFERRED EMBODIMENTS

Figure 1:
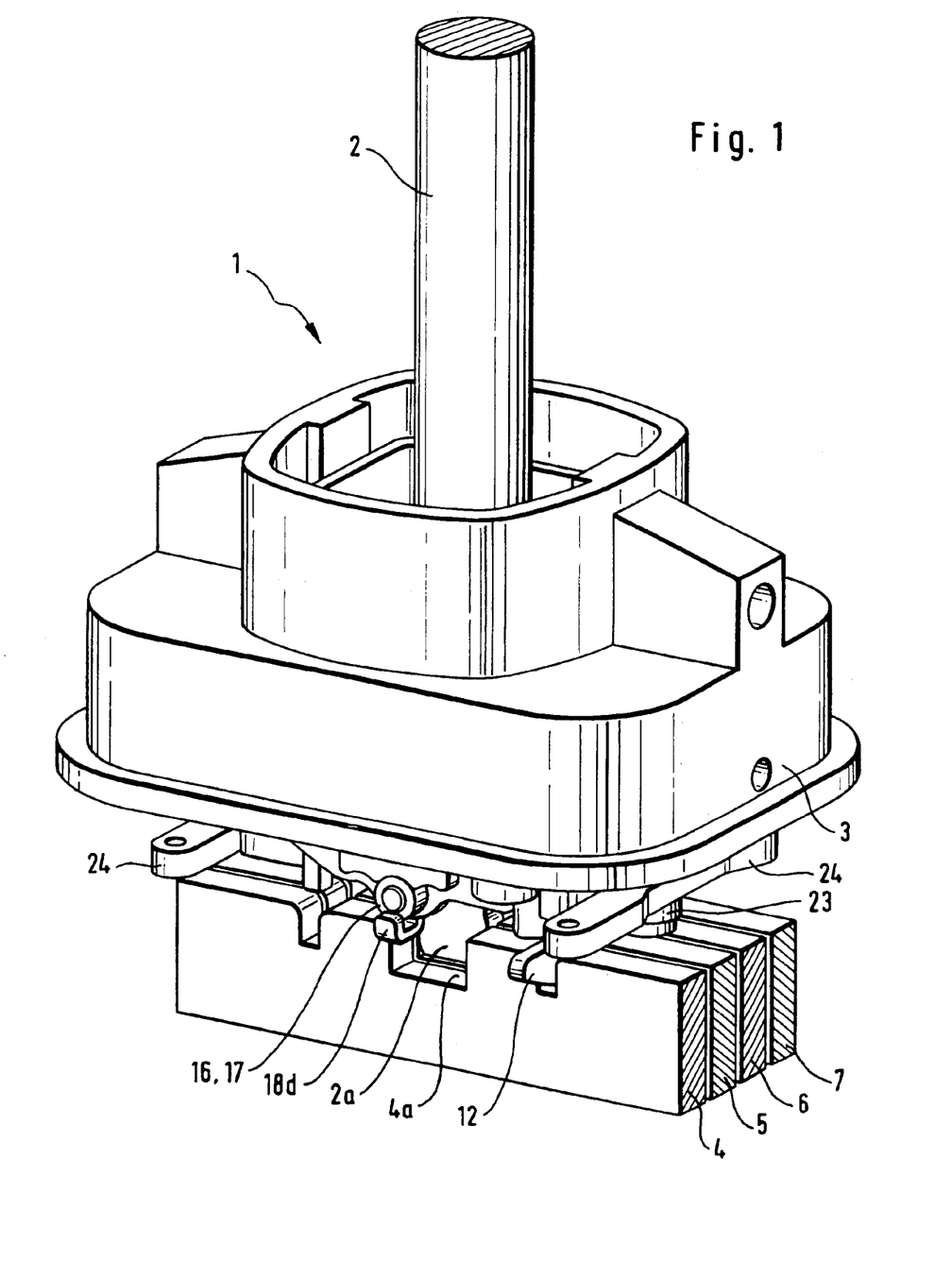
FIG. 1 shows an overall view of the support arrangement.

FIG. 1 shows an overall view of an exemplary embodiment of a support arrangement 1. A shift lever 2 is supported in the support arrangement 1. The support arrangement 1 is received in a housing 3. The shift lever 2 acts selectively with a shift finger 2a on selector shafts 4, 5, 6 and 7. The selector shafts 4, 5, 6 and 7 are respectively provided with an engagement groove 4a, 5a, 6a, 7a, in which the shift lever 2 engages in dependence on its selection position.

Figure 2:
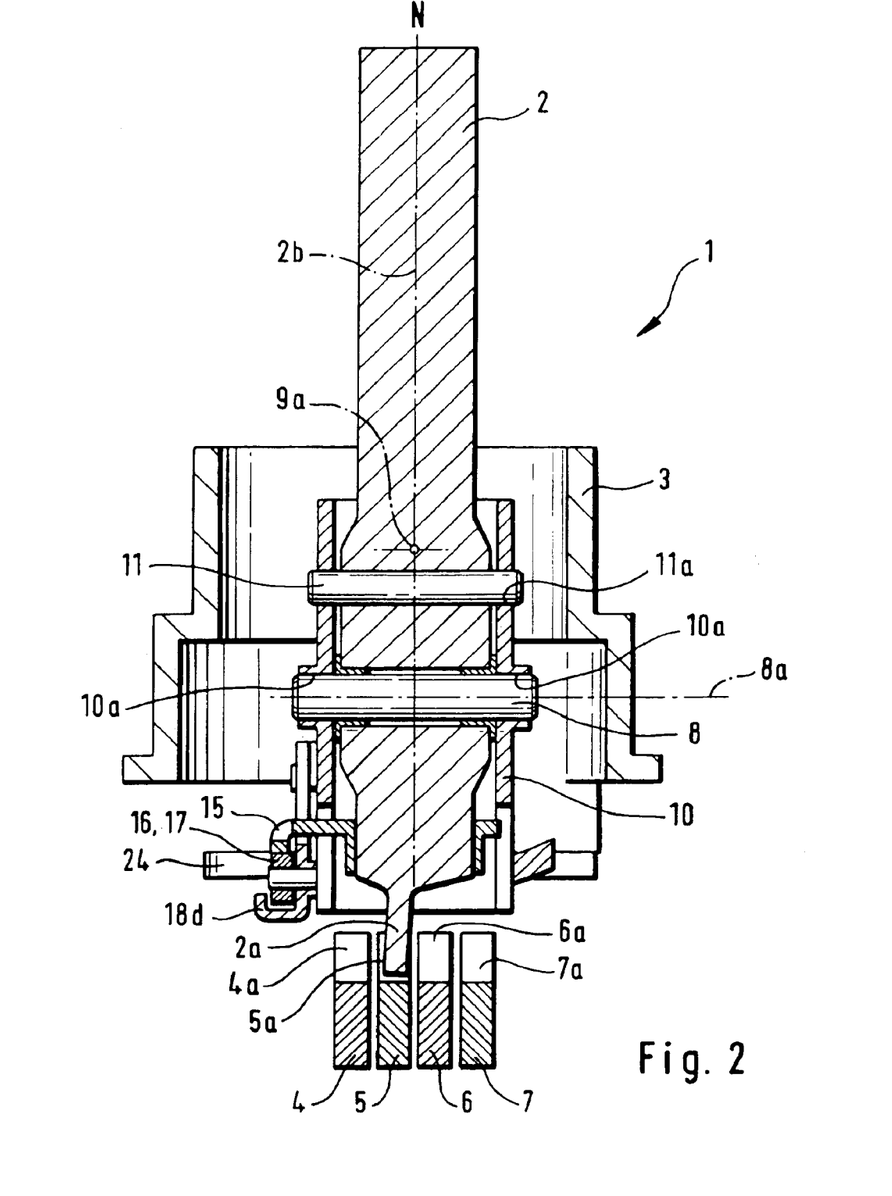
FIG. 2 shows a longitudinal section through the support arrangement.

The support arrangement 1 is shown in section in FIG. 2. The shift lever 2 is in the neutral position N. The shift finger 2a runs at a slight angle to the mid-axis 2b, which is in the neutral position of the shift lever 2, and engages in the engagement groove 5a of the selector shaft 5. The selector shafts 4, 5, 6 and 7 are in a neutral middle position. In this neutral middle position, the engagement grooves 4a, 5a, 6a and 7a are aligned one behind the other in the pivoting direction of the shift lever 2 and also aligned with one another. The shift lever 2 is arranged in the support arrangement 1 to be pivotable out of the neutral position N around the tilt axis 9a running perpendicularly of the drawing. The shift finger 2a is pivotable around the tilt axis 9a with free movement within the engagement grooves 4a, 5a, 6a, and 7a when the shift lever 2 is pivoted. The shift lever 2 is mounted in a casing 10 for pivoting around the pivot axis 8a on a pivot stud 8. The pivot stud 8 is seated fixed in support eyelets 10a of the casing 10. Furthermore, a stop 11 in the form of a pin is fastened in the shift lever 2. The pivoting angle of the shift lever 2 around the pivot axis 8a in a slotted hole 11a extending in the pivoting direction is limited by the stop 11 (see also FIG. 7).

Figure 2A:
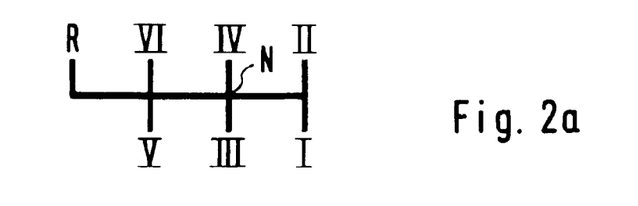
FIG. 2a shows a shift schematic of the positions of the shift lever.

The shift lever 2 with the shift finger 2a is pivotable around the pivot axis 8a from the neutral position N. The shift finger 2a then acts on a side of the engagement groove 5a situated in the pivoting direction. A shift plane from which the third and fourth gears can be shifted is allocated to the selector shaft 5. FIG. 2a shows the shift diagram for the selection or shift positions of the shift knob 2c. The shift lever 2 is pivotable around the tilt axis 9a out of the shift plane III–IV toward the shift plane I–II. In the shift plane I–II, the shift finger 2a engages in the selector shaft 4. The first or second gear can be shifted with the selector shaft 4 by means of the shift lever 2 pivoting around the shift axis 8a. The shift finger 2a pivoted around the tilt axis 9a in the shift plane VI–V engages in the selector shaft 6. The fourth or fifth gear can be selectively switched by pivoting the shift lever 2 around the pivot axis 8a. The shift plane of the reverse gear R is selected by a pivoting movement of the shift lever 2 around the tilt axis 9a out over the shift plane VI–V. The shift finger 2a then engages in the engagement groove 7a of the selector shaft 7. The reverse gear can be shifted into from this position by pivoting the shift lever 2 around the pivot axis 8a.

Figure 5:
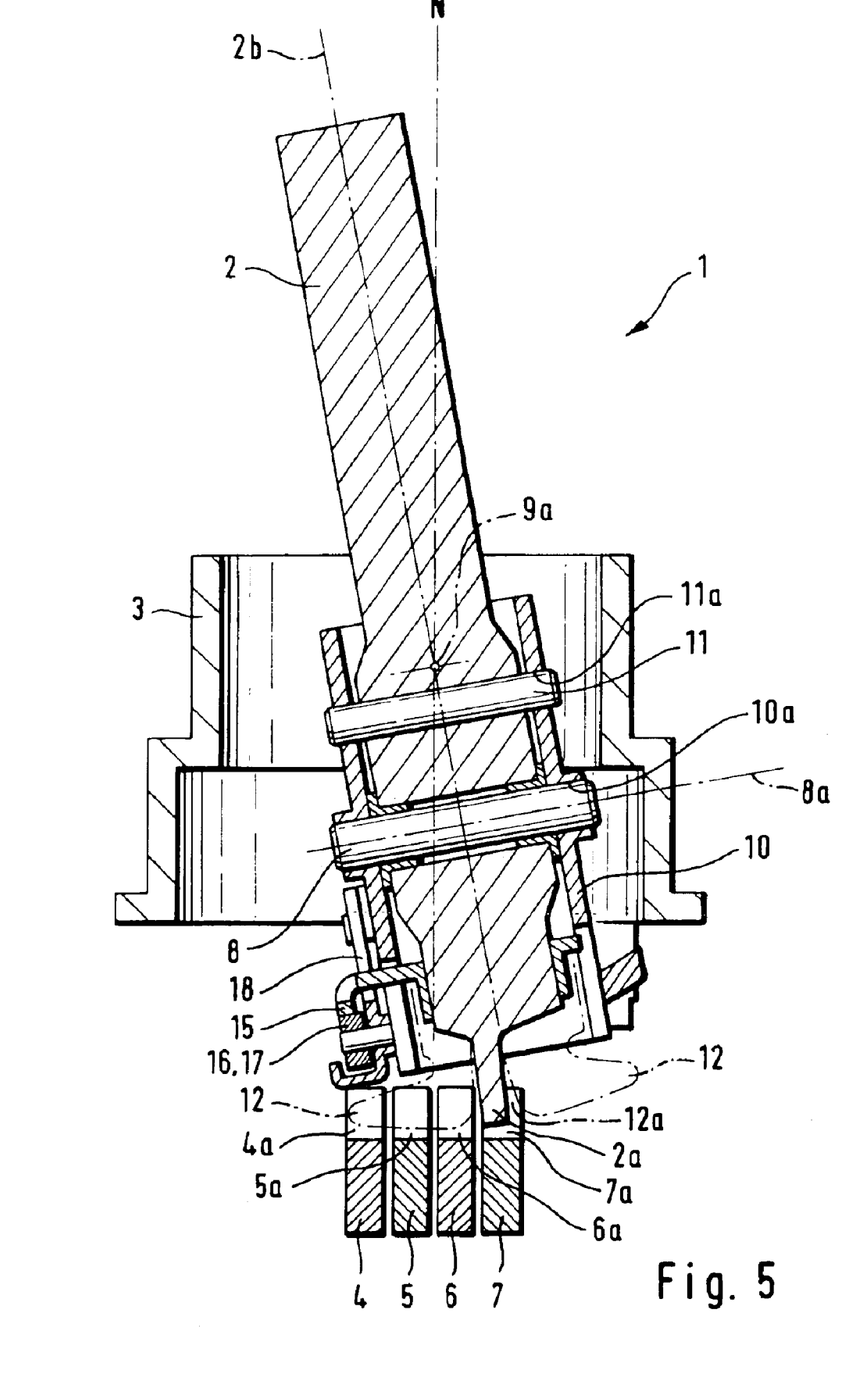
FIG. 5 shows a longitudinal section through the support arrangement with the shift lever pivoted in a selection direction around the tilt axis.

FIG. 5 shows the same section as in FIG. 2. The shift lever 2 is however moved into the shift plane of the reverse gear R by pivoting around the tilt axis 9a. The shift finger 2a engages for this purpose in the engagement groove 7a of the selector shaft 7. From this position, the shift lever 2 is pivotable around the pivot axis 8a. The shift finger 2a pivoting with the shift lever 2 then drives the selector shaft 7 in its longitudinal direction until the reverse gear R is engaged.

Figure 3:
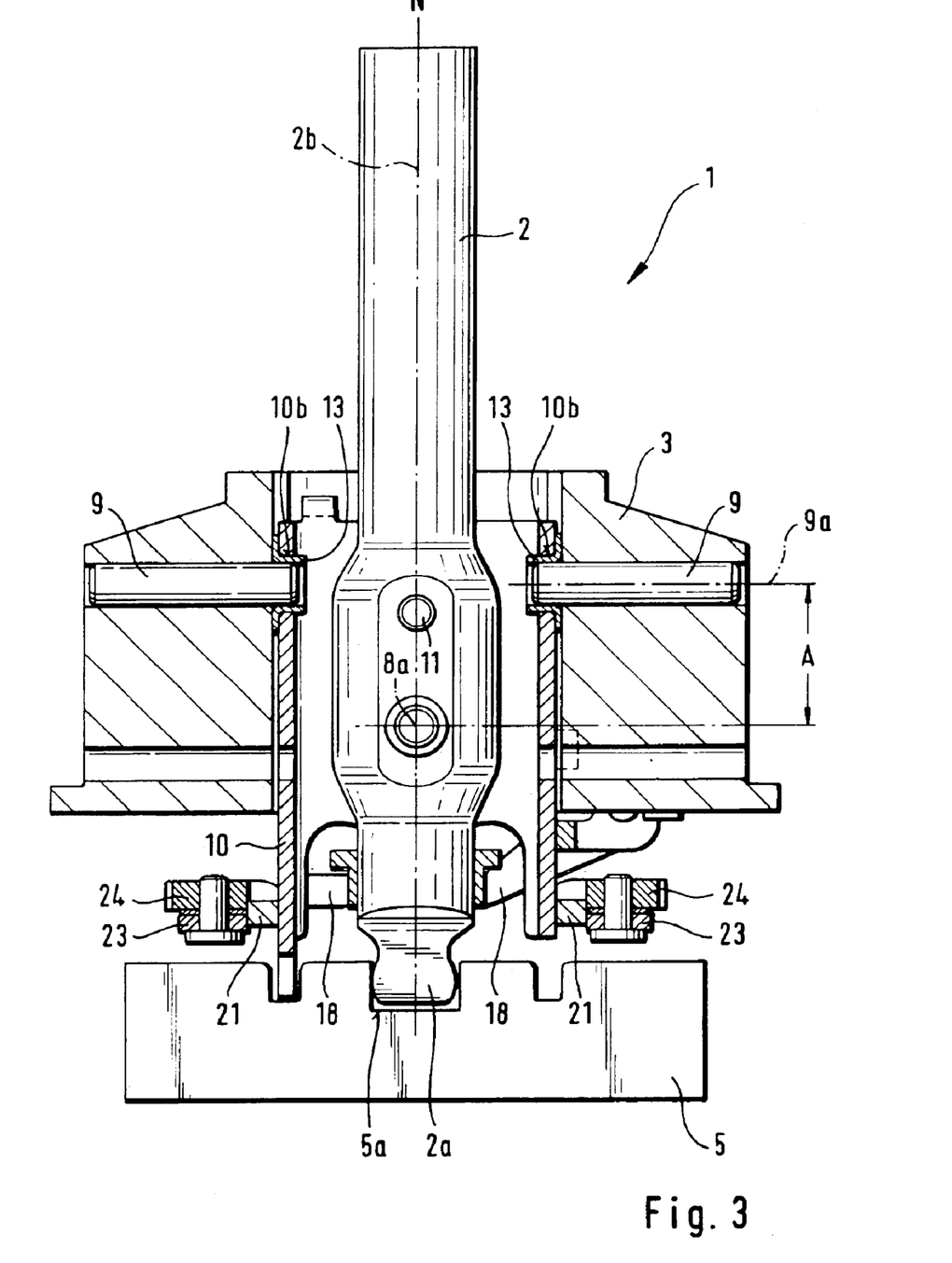
FIG. 3 shows a cross section of the support arrangement.

FIG. 3 shows a cross section of the support arrangement 1. The shift lever 2 is located in the neutral position and engages with its shift finger 2a in the selector shaft 5. In this view, the selector shaft 4 is hidden by the selector shaft 5. The shift finger is positively coupled to the selector shaft 5 by the engagement in the engagement groove 5a. The shift lever 2 is pivotable out of the neutral position around the tilt axis 9a and the pivot axis 8a. The tilt axis 9a is the midline of two pivot studs 9. The pivot studs 9 are arranged fixed in the housing 3 and respectively engage in a support eyelet 10b in the casing 10. The casing 10 is supported on the pivot studs 9 by the shift lever 2 by means of plain bearings 13 in the support eyelet 10b. The pivot axis 8a and the tilt axis 9a run spaced apart from each other by the distance A and also transversely of one another. The pivot axis 8a is situated nearest to the shift finger 2a.

Figure 4:
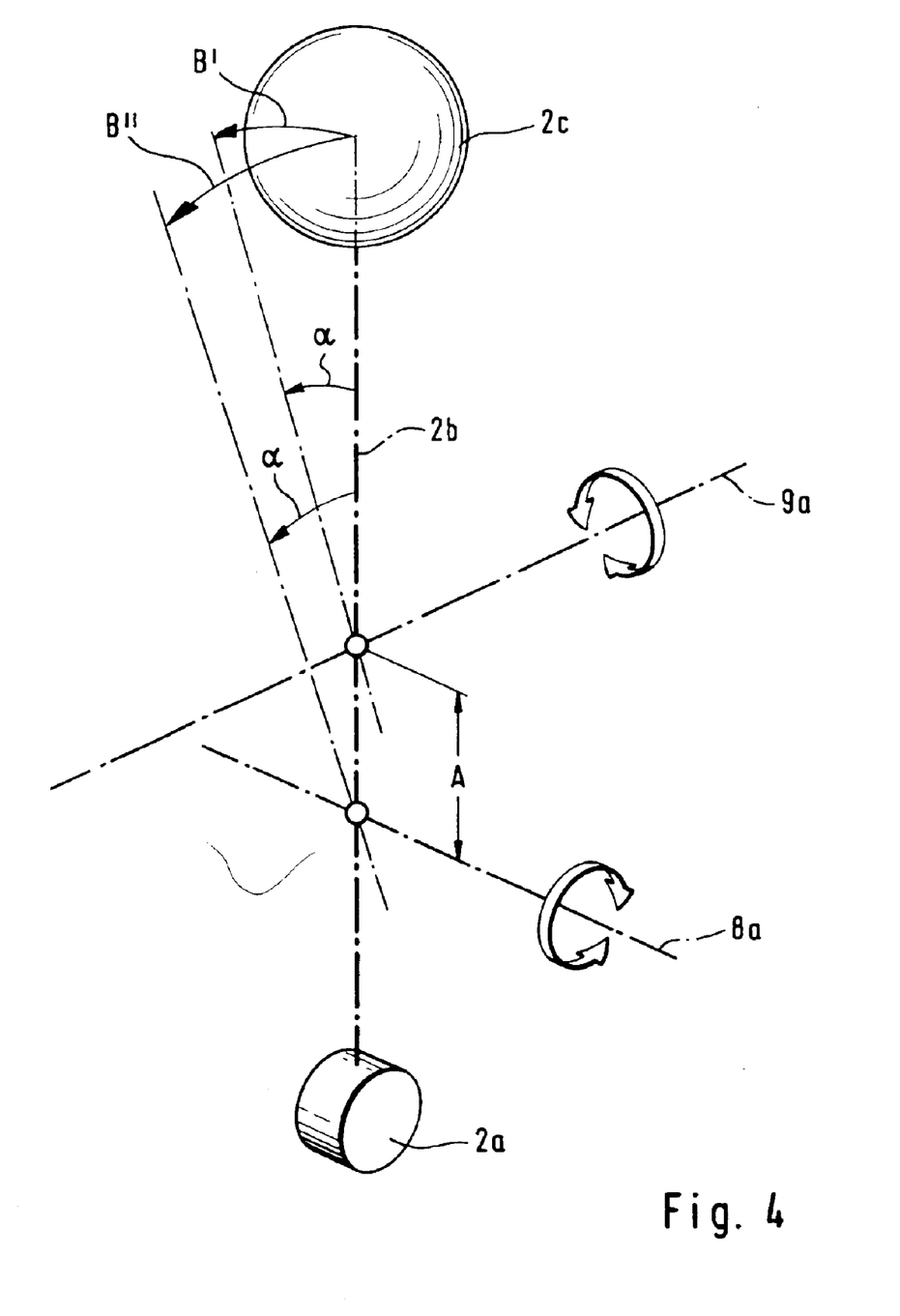
FIG. 4 shows a schematic diagram of the position of the tilt axis and the pivot axis in relation to the shift lever.

FIG. 4, which is a schematic diagram of the shift lever 2 with the axes 8a, 9a, shows that different selection and shift paths at the shift knob 2c of the shift lever can be attained by means of the axes 8a, 9a mutually spaced apart by the distance A. The shift knob 2c travels the path B' in radian measure when the shift lever 2 is pivoted by the angle a around the tilt axis 9a. When the shift lever 2 is pivoted by the same angle a around the pivot axis 8a, the shift knob 2c travels the path B" in radian measure. Because of the distance A between the axis 8a and the axis 9a, B" is greater than B'.

Figure 6:
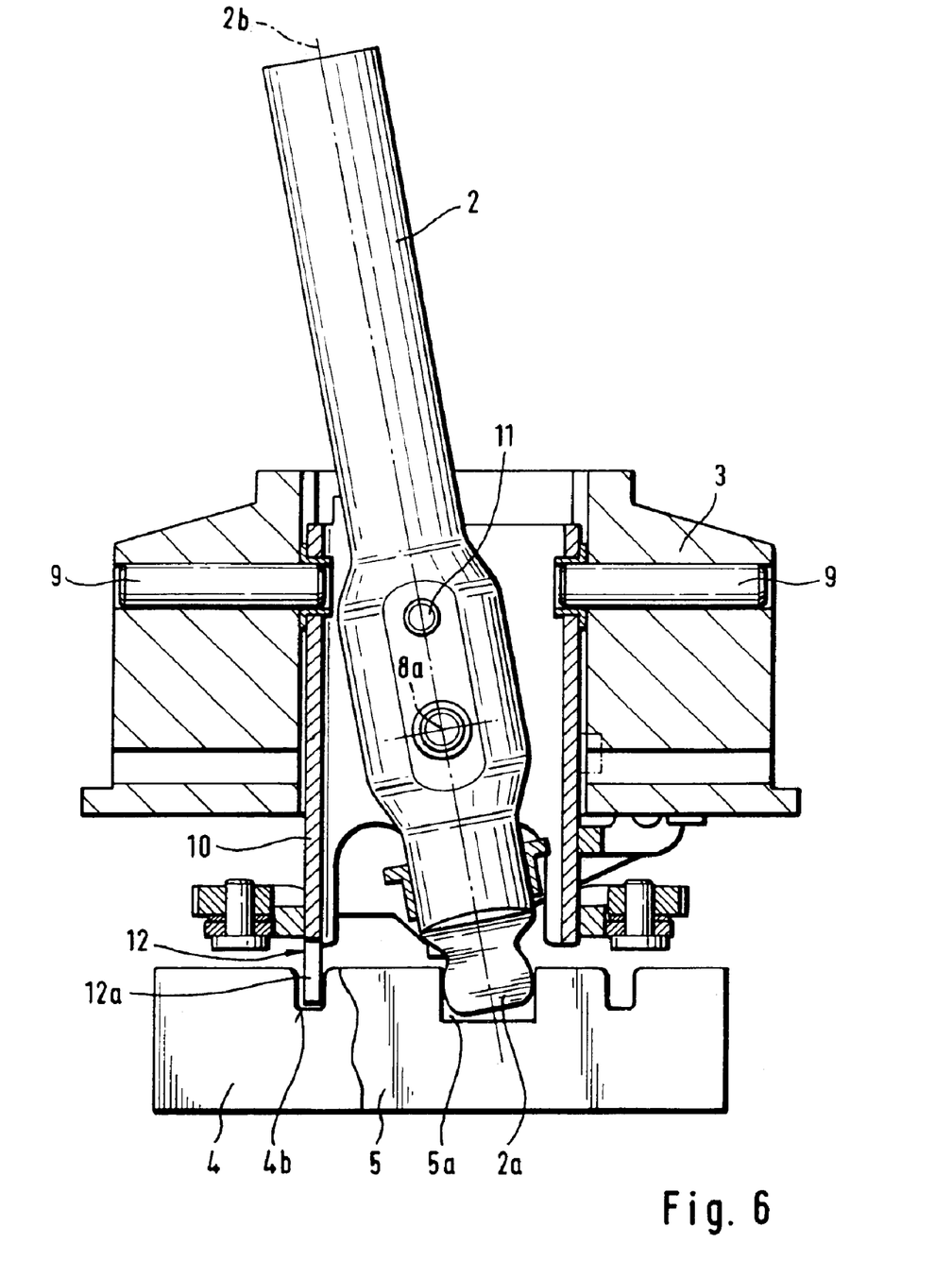
FIG. 6 shows a cross section through the device with the shift lever pivoted around the pivot axis in a shift position.
Figure 9:
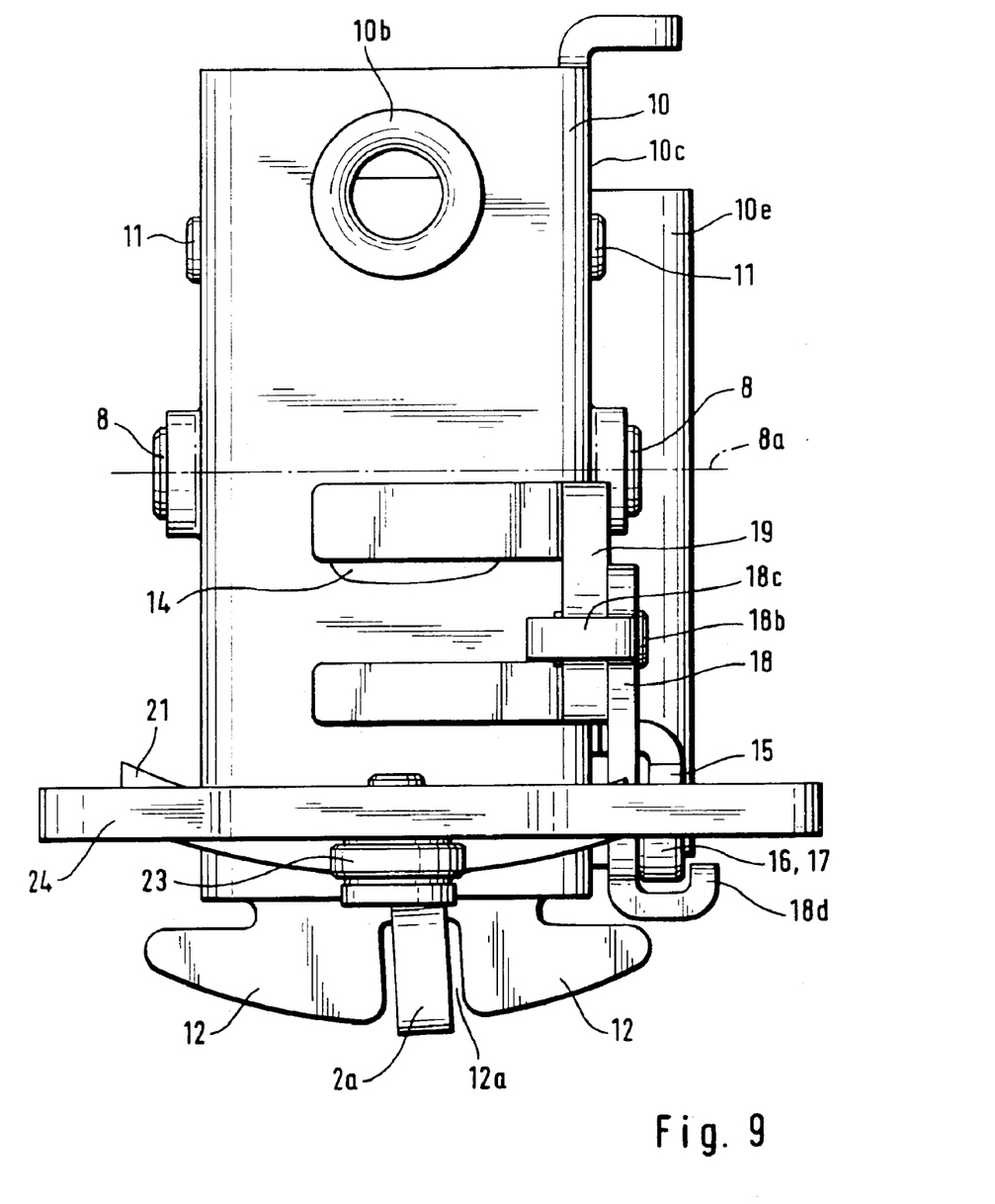
FIG. 9 shows a side view of the support arrangement with the locking finger.

FIG. 6 shows the support arrangement 1 in the same sectional illustration as in FIG. 3. The shift lever 2a is pivoted around the pivot axis 8a into a shift position and thus has displaced the selector shaft 5 in its longitudinal direction by means of the shift finger 2a. The selector shaft 4 remains unchanged in its position. In this position, the selector shaft 4 is fixed to the casing 10 by means of a locking finger 12. The locking finger 12 engages in a slot 4b on the selector shaft 4 for this purpose. In FIG. 5, the locking finger 12 is at least partially shown in a front view. The locking finger is divided by means of a clearance space 12a. By means of the clearance space 12a, the selector shaft 5 is displaceable in the arrangement illustrated according to FIG. 6 without contact with the locking finger 12. As can be seen from the view in FIG. 5, the locking finger pivots with the shift finger around the tilt axis 9a when one of the shift planes is selected with the shift lever 2. In FIG. 5, the locking finger 12, by means of the clearance space 12a, releases the selector shaft 7 for shifting to the reverse gear, and in FIG. 6 the selector shaft 5 for shifting one of the gears allocated to the selector shaft 5. FIG. 9 shows the casing 10 with the locking finger 12, without the selector shafts. The shift finger 2a is pivotable around the pivot axis 8a in the direction of the clearance space 12a, so that each of the selector shafts in engagement with the shift finger 2a is displaceable without contact with the locking finger 12, due to the clearance space 12a.

Figure 7:
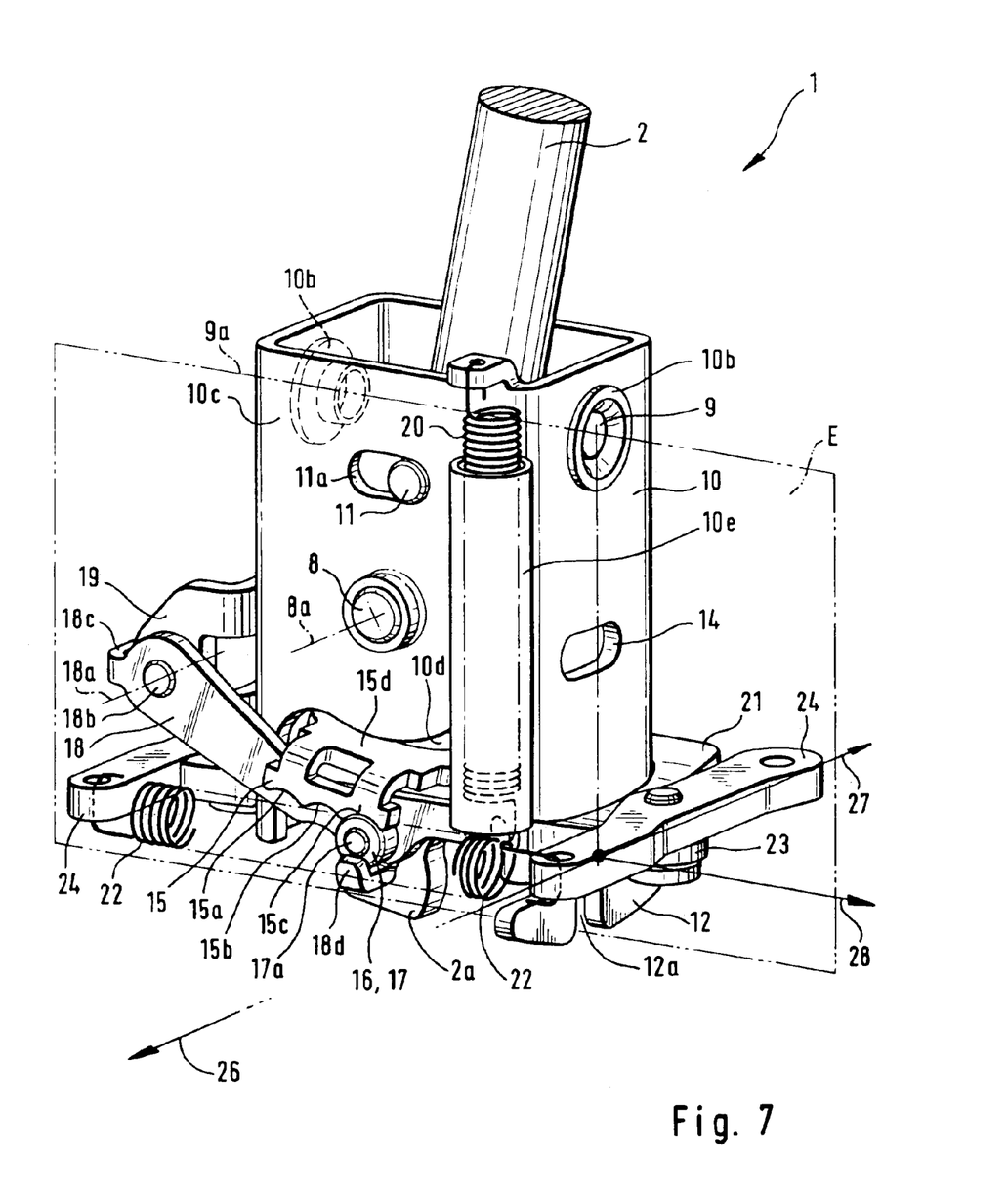
FIG. 7 shows an overall view of the support arrangement without the housing.

FIG. 7 shows the support arrangement 1 without the housing 3. The casing 10 is manufactured from a profile or is bent into a profile from sheet metal. Slotted holes 11a and 14 are formed in the casing. The stop 11 engages in the slotted hole 11a, as already initially described. The stop 11 extends from the shift lever 2. The pivot angle of the shift lever 2 around the pivot bolt 8 in the casing 10 is limited by the stop 11 in the slotted hole 11a. The stop 11 abuts on a respective end of the slotted hole 11a when a gear is shifted. A stop (not shown) extending from the housing 3 engages in the slotted hoe 14. The pivoting movement of the casing 10 around the tilt bolt 9 is limited by means of the stop in the slotted hole 14.

The support arrangement 1 has a latch contour 15 with latch depressions 15a, 15b and 15c. The latch contour 15 is formed from sheet metal. The metal sheet is bent angularly and fastened to the shift lever 2 by means of a prolongation 15d extending from the latch contour 15. The prolongation 15d here passes through a wall 10c of the casing 10 through which the pivot axis 8a of the shift lever 2 passes, at an opening 10d of the wall. A latch element 16 is preloaded against the latch contour 15. The latch element 16 is a roller 17. The roller 17 is rotatably seated on a bolt 17a. The bolt 17a is fastened to a pivot lever 18. The pivot lever 18 is fastened to a bolt 18b for pivoting around the pivot point 18a. The bolt 18b is fastened to a projection 19 aligned with the tilt axis 9a and pointing away from the rotation axis of the roller 17. The pivot lever 18 is formed from sheet metal and has a hook-shaped end 18c. The hook-shaped end 18c engages behind a projection 19 on a side remote from the pivot lever 18. The pivot lever 18 is thereby secured to the bolt 18b axially at the projection 19. The roller 17 which, rotatable around its rotation axis, is mounted on the pivot lever 18 is secured by means of a further hook-shaped end 18d to the pivot lever 18. The hook-shaped end 18d then engages behind the roller 17 at a side remote from the pivot lever 18.

The pivot lever 18 is loaded at an end remote from the pivot point 18a by a spring 20. The spring 20 is a tension spring and has one end inset into the pivot lever 18 and the other end inset into the casing 10. The spring 20 pulls the pivot lever 18 with the roller 17 against the latch contour 15 and is guided in a bushing 10e on the casing 10. The shift lever 2 is located in a shifted position in FIG. 7, pivoted around the pivot axis 8a. The stop 11 abuts one end of the slotted hole 11a. In this position, the roller 17 is latched in the latch depression 15c and arrests the shift lever 2 in its position. If the shift lever 2 is pivoted around the pivot axis 8a in the opposite sense to its existing pivoting position, the roller 17 rises out of the latch depression 15c and next latches in the latch depression 15b. In this position, the shift lever 2 is either in the neutral position or in one of the inoperative positions of the shift planes before the shifting of a gear. If the latch lever 2 is further pivoted in this direction, the roller 17 finally latches in the latch depression 15a and arrests the shift lever 2 in a further shift position.

The support arrangement 1 has a device for increasing selection forces. As can be gathered from FIGS. 8a and 8b, the device is formed from two ramps 21, a runoff roller 23 respectively preloaded against the ramp by a spring 22, and also two levers 24. The ramps 21 are formed on a stirrup-shaped metal sheet 25. The metal sheet 25 is fastened to the casing 10. The levers 24 are respectively arranged. pivotably in the direction of the casing 10 around a fixed pivot 24a fixed to a housing (not shown). Each of the runoff rollers 23 is rotatably arranged on a lever 24. The tension spring 22 is respectively hooked with one of its ends into an end of the lever 24 opposed to the pivot 24a. The levers 24 are preloaded against one another by means of the tension spring and thus against the casing 10. Thus a respective one of the rollers 23 is pulled by the lever 24 against a respective one of the ramps 21.

Figure 8A:
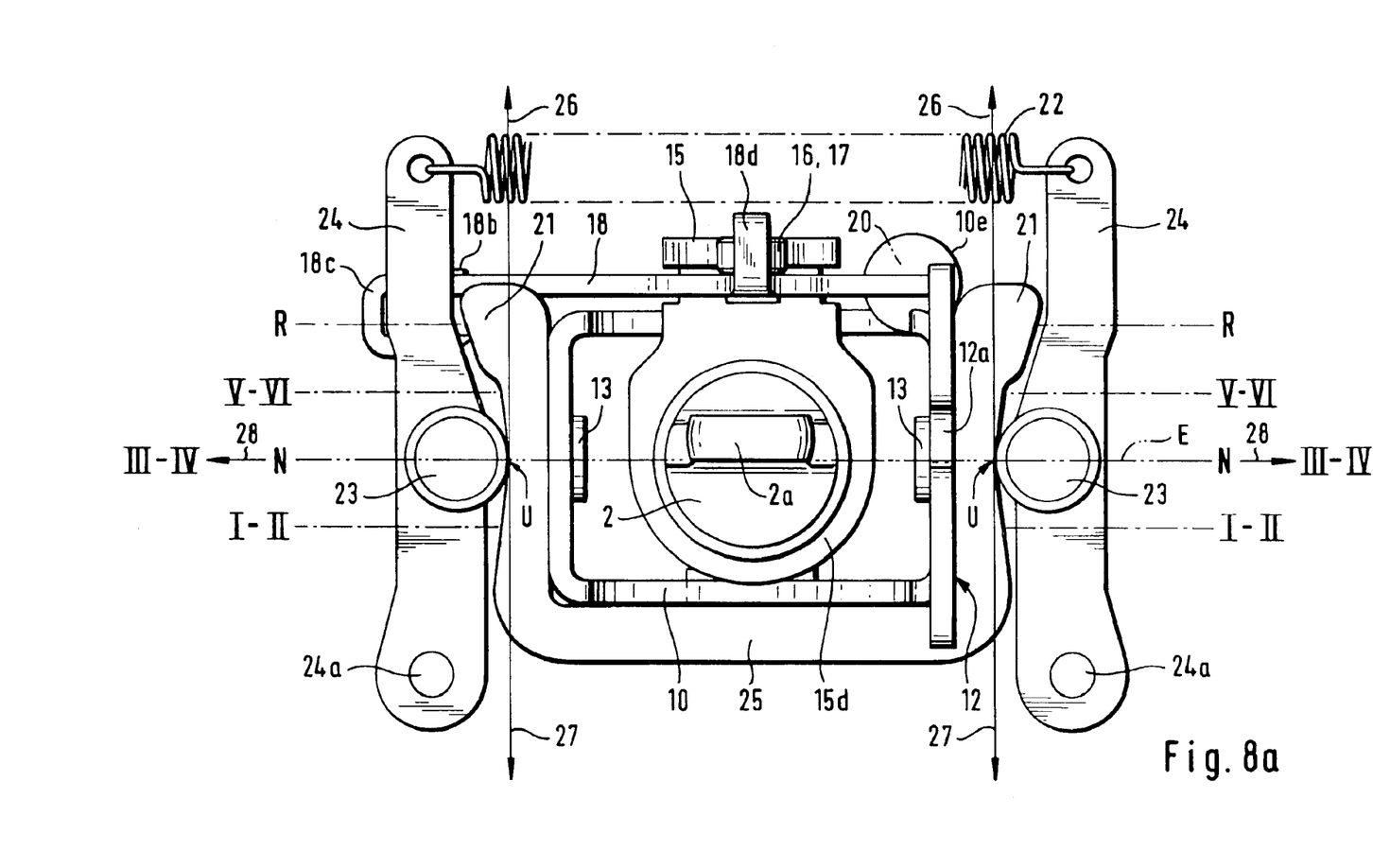
FIG. 8a shows a view of the support arrangement from below, in the neutral position of the shift lever.
Figure 8B:
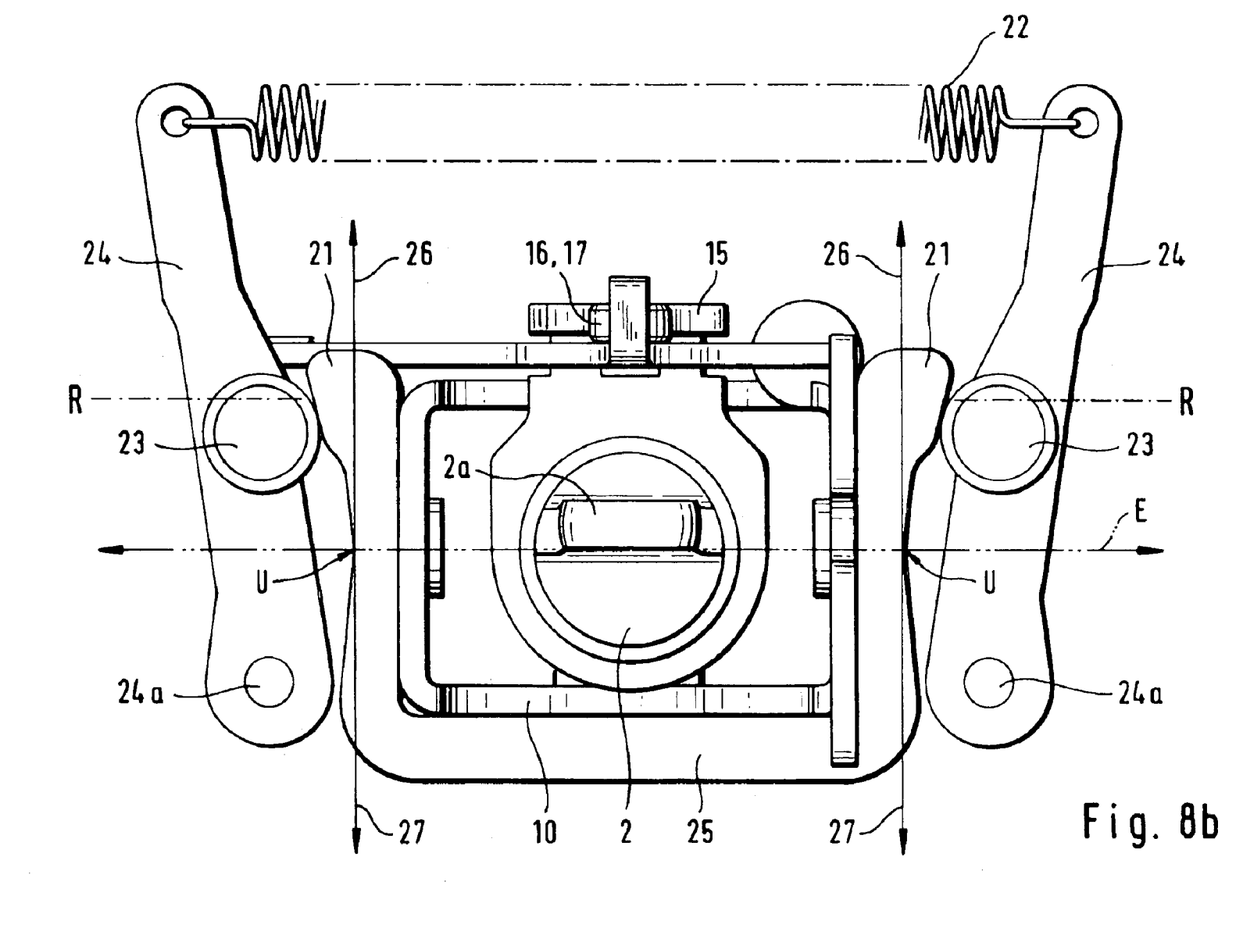
FIG. 8b shows a view of the support arrangement from below, with the shift lever pivoted into the shift plane of the reverse gear.

The ramps 21 are divided into sections of different slope, and each has the same ramp contour. The contour of each ramp 21 rises over two abscissas 26, 27 pointing in opposite directions starting from a coordinate origin U. The abscissas 26 and 27 start transversely from an imaginary plane E and are thus aligned parallel to the pivot axis 8a of the shift lever 2 (FIGS. 7, 8a, 8b). The plane E runs with the tilt axis 9a of the shift lever 2 and has the pivot axis of the shift lever 2 passing through it at right angles. The coordinate origin U is situated in the plane E. A shift lever pivoted around the tilt axis 9a pivots the casing 10 with the ramp 21 against the runoff roller 23 which is fixed in the pivoting direction. The contour of the ramps 21 is moved in the pivoting direction to the rotation axis of the runoff roller 23, whereby the respective runoff roller 23, preloaded against the ramp 21, rolls rising on the ramp 21. The ordinate 28 aligned at right angles to the abscissas 26 and 27 runs parallel to the tilt axis 9a with the plane E.

Since the ramp 21 rises away from the plane E on both sides of the coordinate origin U, a respective roller 23 on a ramp 21 in the neutral position N of the shift lever is centered at the coordinate origin U. The ramp 21 runs initially with a shallow rise over both the abscissa 26 and also over the abscissa 27. The runoff rollers 23 rising on the sections with the shallow rise produce at the shift lever 2, pivoted for selecting a shift plane with a forward gear, a relatively small selection force. Upon shifting one of the gears from the shift planes, the runoff rollers 23 respectively remain in one of the positions denoted I–II or V–VI on the respective ramp 21. In these positions, the shift lever 2 is in one of the shift planes I–II or V–VI, from which a gear can then be engaged in the respective shift plane by pivoting the shift finger 2. If the shift lever 2 is pivoted further out with the casing 10 over the position V–VI, the runoff roller 23 rising on the ramp 21 encounters a section of the ramp 21 which rises sharply away from the abscissa 26. A selection force is exerted on the casing 10 and thus on the shift lever 2 because of the steep rise, and is markedly greater than the selection force for selection of the forward gears. The shift lever 2 is about to move into the shift plane for shifting to the reverse gear R. The steep rise on the ramp 21 is finally followed by a shallower rise until in the position R. If the runoff roller 23 is in the position R, the shift plane of the reverse gear is selected. This position is shown in the drawing of FIG. 8b. The shift lever 2 can be pivoted out of the position R around the pivot axis 8a for shifting to the reverse gear R.

Figure 10:
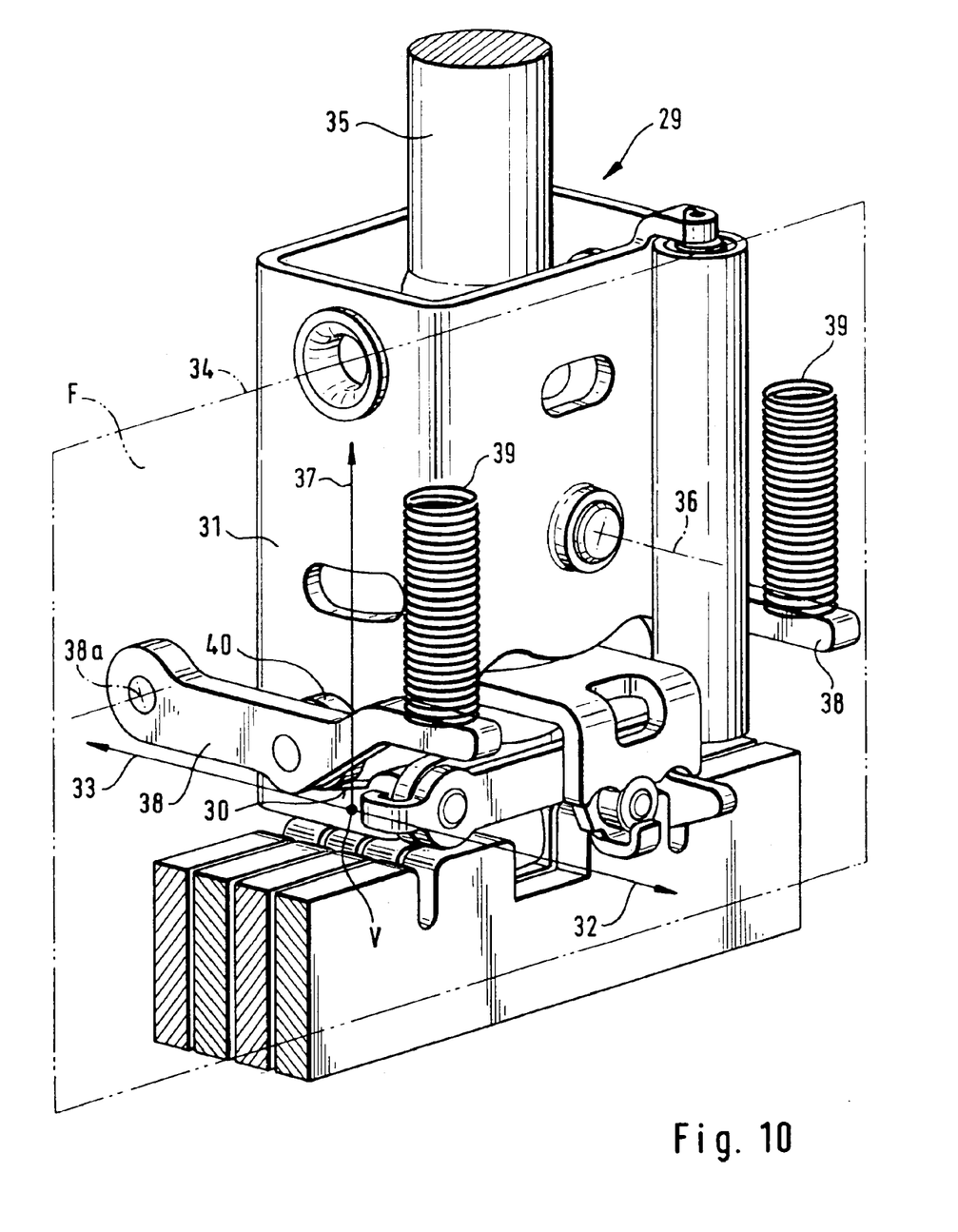
FIG. 10 shows a further exemplary embodiment of a support arrangement according to the invention, without housing.

FIG. 10 shows a further exemplary embodiment of a support arrangement according to the invention. The support arrangement 29 is shown without the housing. Its construction substantially corresponds to the support arrangement 1 of FIGS. 1–9. However, it differs in the construction of the arrangement of the device for increasing the selection force. The support arrangement 29 has two ramps 30, one of which is shown in the drawing, the other being hidden by a casing 31. The ramp 30 rises in this embodiment over two abscissas 32 and 33 pointing in opposite directions. The abscissas start at right angles from an imaginary plane F running with the tilt axis 34 of the shift lever 35 and having the pivot axis 36 of the shift lever 35 passing through it at right angles. The coordinate origin V of the coordinate system is situated in the plane F. An ordinate 37 running in the plane F starts from the coordinate origin V, at right angles to the abscissas 32 and 33. The ramp 30 rises over the abscissas 32 from the coordinate origin V and thus faces toward the tilt axis 34. A respective lever 38 mounted to the housing (not shown) for pivoting around a fulcrum 38a is preloaded by means of a compression spring 39 against a respective ramp 30. A runoff roller 40 is rotatably fastened to each of the levers 38. Each of the springs 39 is a compression spring and presses a respective one of the levers 38 to the runoff roller 40 against the ramp 30. The shift lever 35, pivoted with the casing 31 around the tilt axis 34, pivots the ramps 30 against the runoff roller 40 which is fixed to the lever 38 in the direction of movement of the ramps 30. The runoff roller 40 rises on the ramp 30, rolling on the ramp 30.

| REFERENCE NUMBERS | | | | | |
|---|---|---|---|---|---|
| 1 | support | 10c | wall | 19 | projection |
|  | arrangement | 10d | opening | 20 | spring |
| 2 | shift lever | 10e | bushing | 21 | ramp |
| 2a | shift finger | 11 | stop | 22 | spring |
| 2b | mid-axis | 11 | slotted hole | 23 | runoff roller |
| 2c | shift knob | 11 | stop | 24 | lever |
| 3 | housing | 11a | slotted hole | 24a | fulcrum |
| 4 | selector shaft | 12 | locking finger | 25 | metal sheet |
| 4a | engagement | 12a | clearance | 26 | abscissa |
|  | groove | 13 | slide bearing | 27 | abscissa |
| 4b | slot | 14 | slotted hole | 28 | ordinate |
| 5 | selector shaft | 15 | lotch contour | 29 | support |
| 5a | engagement |  | latch |  | arrangement |
|  | groove | 15a | latch | 30 | ramp |
| 6 | selector shaft |  | depression | 31 | casing |
| 6a | engagement | 15b | latch | 32 | abscissa |
|  | groove |  | depression | 33 | abscissa |
| 7 | selector shaft | 15c | latch | 34 | tilt axis |
| 7a | engagement |  | depression | 35 | shift lever |
|  | groove | 16 | latch element | 36 | pivot axis |
| 8 | pivot stud | 17 | roller | 37 | ordinate |
| 9 | pivot stud | 17a | bolt | 38 | lever |
| 9a | tilt axis | 18 | pivot lever | 39 | spring |
| 10 | casing | 18a | pivot point | 40 | runoff roller |
| 10a | support eyelet | 18b | bolt |  |  |
| 10b | support eyelet | 18c | end |  |  |
|  |  | 18d | end |  |  |

What is claimed is:

1. Device for increasing a selection force on a shift lever (2, 35) pivotable around a pivot axis (8a, 36) and also around a tilt axis (9a, 34) aligned transversely to the pivot axis (8a 36), the selection force upon pivoting movements of the shift lever (2, 35) around the tilt axis (9a, 34) being produced by at least one lever (24, 38) movable against at least one spring (22, 39) and a runoff roller (23, 40) placed in operative connection with the lever (24, 38), the device is integrated into a support arrangement (1, 29) for pivotable support of the shift lever (2, 35) by a casing (10, 31) in a housing (3); wherein the support arrangement (1, 29) supports the shift lever (2, 35) pivotably with respect to the casing (10, 31) around the pivot axis (8a, 36) and also supports the shift lever (2, 35) with the casing (10, 31) pivotably with respect to the housing (3) around the tilt axis (9a, 34) aligned transversely to the pivot axis (8a, 36) the device is formed by two ramps (21, 30) fixed to the casing and the runoff roller (23, 40) is rotatably fastened to the lever (24, 38); wherein the lever (24, 38) is pivotable around a fulcrum (24a, 38a) fixed to the housing (3) and is preloaded via the runoff roller (23, 40) against the ramp (21, 30) by the at least one spring (22, 39) engaging the lever (24, 38) at a point remote from the fulcrum (24a, 38a); and wherein the ramp (21, 30) pivots with the casing (10, 31) around the tilt axis (9a, 34) upon pivoting movements of the shift lever (2, 35) and the runoff roller (23, 40) supported on the housing (3) rolls on the ramp (21, 30), and two of the levers are provided with a respective one of the levers (24) acting on a respective one of the ramps (21), the levers (24), having the casing (10) with the ramps (21) between them, are preloaded against each other by at least one tension spring (22); and the tension spring (22) is connected at a free end, remote from the fulcrum (24a), of each one of the levers (24).

2. Device according to claim 1, wherein the ramp (21, 30) rises, starting from the coordinate origin situated in the plane, over a first abscissa (26, 27, 32, 33) and also over a second abscissa (26, 27, 32, 33) directed oppositely to the first abscissa (26, 27, 32, 33), on both sides away from the plane; the ramp (21, 30) keeping the shift lever (2, 35) in a neutral position by the runoff roller (23, 40) centered on the ramp (21, 30) at a coordinate origin; and wherein the ramp (21, 30) initially has a shallow rise from the coordinate origin over the first abscissa (26, 33) and also has a shallow rise over the second abscissa (27, 32); the ramp (21, 30) in a further course over the second abscissa (27, 32) adjoining the shallow rising ramp (21, 20) rises at a steeper angle away from the second abscissa (27, 32) and finally extends out at a shallow angle; and wherein the runoff roller (23, 40) rolls on the shallow rising ramp (21, 30) when the shift lever (2, 35) pivots from a neutral position selectively into a pivot direction, and also encounters the steeper angle portion of the ramp (21, 20) when the shift lever (2, 35) pivots around the tilt axis (9a, 34) on the second abscissa (27, 32).

3. Device for increasing a selection force on a shift lever (2, 35) pivotable around a pivot axis (8a, 36) and also around a tilt axis (9a, 34) aligned transversely to the pivot axis (8a, 36), the selection force upon pivoting movements of the shift lever (2, 35) around the tilt axis (9a, 34) being produced by at least one lever (24, 38) movable against at least one sprint (22, 39) and a runoff roller (23, 40) placed in operative connection with the lever (24, 38), wherein the device is integrated into a support arrangement (1, 29) for pivotable support of the shift lever (2, 35) by a casing (10, 31) in a housing (3); wherein the support arrangement (1, 29) supports the shift lever (2, 35) pivotably with respect to the casing (10, 31) around the pivot axis (8a, 36) and also supports the shift lever (2, 35) with the casing (10, 31) pivotably with respect to the housing (3) around the tilt axis (9a, 34) aligned transversely to the pivot axis (8a, 36), the device is formed by at least one ramp (21, 30) fixed to the casing and the runoff roller (23, 40) is rotatable fastened to the lever (24, 38); wherein the lever (24, 38) is pivotable around a fulcrum (24a, 38a) fixed to the housing (3) and is preloaded via the runoff roller (23, 40) against the ramp (21, 30) by the at least one sprint (22, 39) engaging the lever (24, 38) at a point remote from the fulcrum (24a, 38a); and wherein the ramp (21, 30) pivots with the casing (10, 31) around the tilt axis (9a, 34) upon pivoting movements of the shift lever (2, 35) and the runoff roller (23, 40) supported on the housing (3) rolls on the ramp (21, 30), the ramp (21, 30) rises over at least one imaginary abscissa (26, 27, 32, 33) extending transversely from an imaginary plane extending with the tilt axis (9a, 34) and thus also has the pivot axis (8a, 36) passing through it at right angles; and wherein the ramp (21, 30) extends rising away from the plane over the abscissa (26, 27, 32, 33), whereby the runoff roller (23, 40), with the shift lever (2, 35) pivoted around the tilt axis (9a, 36), rises on the ramp against the force of the spring (22, 39).

4. Device according to claim 3, wherein the ramp (21, 30) has an initially shallow rise over the abscissas (27, 32) from a coordinate origin, and the ramp (21, 30) in its further course adjoining the shallow rise, rises at a steeper angle away from the abscissas (27, 32) and finally extends at a shallower angle; and wherein the runoff roller (23, 40), when the shift lever (2, 35) pivots around the tilt axis (9a, 34) out of the neutral position, initially rolls on the shallow rise of the ramp (21, 30) and when the shift lever (2, 35) pivots further in the same pivoting direction, encounters the steeper angle portion.

5. Device according to claim 4, wherein an ordinate (28) describing a course of the ramp (21) extends in a plane parallel to the tilt axis (9a).

6. Device according to claim 4, wherein an ordinate (28) describing a course of the ramp (21) extends in a plane parallel to the tilt axis (9a); and wherein the rotation axis of the lever (24) running through the fulcrum (24a) and the rotation axis of the runoff roller (23) are aligned transversely of the tilt axis (9a) of the shift lever (2).

7. Device according to claim 4, wherein an ordinate (37) describing a course of the ramp extends in a plane aligned perpendicularly with respect to the tilt axis (34).

8. Device according to claim 4, wherein an ordinate (37) describing a course of the ramp extends in a plane aligned perpendicularly with respect to the tilt axis (34); and wherein the rotation axis of the lever (38) running through the fulcrum (38a) and the rotation axis of the runoff roller (40) are aligned parallel to the tilt axis (34) of the shift lever (35).

9. Device according to claim 3, wherein an ordinate (28) describing a course of the ramp (21) extends in a plane parallel to the tilt axis (9a).

10. Device according to claim 3, wherein an ordinate (28) describing a course of the ramp (21) extends in a plane parallel to the tilt axis (9a); and wherein the rotation axis of the lever (24) running through the fulcrum (24a) and the rotation axis of the runoff roller (23) are aligned transversely of the tilt axis (9a) of the shift lever (2).

11. Device according to claim 3, wherein an ordinate (37) describing a course of the ramp extends in a plane aligned perpendicularly with respect to the tilt axis (34).

12. Device according to claim 3, wherein an ordinate (37) describing a course of the ramp extends in a plane aligned perpendicularly with respect to the tilt axis (34); and wherein the rotation axis of the lever (38) running through the fulcrum (38a) and the rotation axis of the runoff roller (40) are aligned parallel to the tilt axis (34) of the shift lever (35).

13. Device according to claim 3, wherein the ramp (21, 30) rises, starting from the coordinate origin situated in the plane, over a first abscissa (26, 27, 32, 33) and also over a second abscissa (26, 27, 32, 33) directed oppositely to the first abscissa (26, 27, 32, 33), on both sides away from the plane; the ramp (21, 30) keeping the shift lever (2, 35) in a neutral position by the runoff roller (23, 40) centered on the ramp (21, 30) at a coordinate origin; and wherein the ramp (21, 30) initially has a shallow rise from the coordinate origin over the first abscissa (26, 33) and also has a shallow rise over the second abscissa (27, 32); the ramp (21, 30) in a further course over the second abscissa (27, 32) adjoining the shallow rising ramp (21, 20) rises at a steeper angle away from the second abscissa (27, 32) and finally extends out at a shallow angle; and wherein the runoff roller (23, 40) rolls on the shallow rising ramp (21, 30) when the shift lever (2, 35) pivots from a neutral position selectively into a pivot direction, and also encounters the steeper angle portion of the ramp (21, 20) when the shift lever (2, 35) pivots around the tilt axis (9a, 34) on the second abscissa (27, 32).

* * * * *